(12) United States Patent
Axmon et al.

(10) Patent No.: US 9,668,192 B2
(45) Date of Patent: May 30, 2017

(54) CELL BOUNDARY CROSSING IN A UNIDIRECTIONAL SFN FOR HIGH SPEED TRAINS

(71) Applicant: Telefonaktiebolaget LM Ericsson (publ), Stockholm (SE)

(72) Inventors: Joakim Axmon, Kavlinge (SE); Magnus Larsson, Sollentuna (SE); Walter Muller, Upplands Vasby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/050,618

(22) Filed: Feb. 23, 2016

(65) Prior Publication Data

US 2017/0105161 A1   Apr. 13, 2017

Related U.S. Application Data

(60) Provisional application No. 62/240,286, filed on Oct. 12, 2015.

(51) Int. Cl.
*H04W 36/32* (2009.01)
*H04W 36/16* (2009.01)
(Continued)

(52) U.S. Cl.
CPC .......... *H04W 36/32* (2013.01); *H04W 36/04* (2013.01); *H04W 36/165* (2013.01); *H04W 36/36* (2013.01); *H04W 52/40* (2013.01)

(58) Field of Classification Search
None
See application file for complete search history.

(56) References Cited

U.S. PATENT DOCUMENTS 5,930,721 A * 7/1999 Fried ............... H04W 48/18
455/437
2010/0054235 A1   3/2010 Kwon et al.
(Continued)

FOREIGN PATENT DOCUMENTS

WO   2012130270   10/2012

OTHER PUBLICATIONS

3GPP TSG-RAN WG4 Meeting #74bis, R4-151365, Modified arrangement for RRH based model, Rio de Janiro, Brazil, Apr. 20-24, 2015, 3 pages.
(Continued)

*Primary Examiner* — Diane Mizrahi
(74) *Attorney, Agent, or Firm* — Leffler Intellectual Property Law, PLLC

(57) ABSTRACT

A first network node has first antenna nodes located along a track and associated with a first cell. Some of them serve a first cell overlap region that overlaps a second cell overlap region of second antenna nodes connected to a second network node. Some first antenna nodes form downlink beams in a same direction with power levels controlled such that respective amounts of overlap between the downlink beams and respective power levels of the downlink beams jointly cause the first cell's overlap region to emulate a cell border for a user equipment travelling at high speed. Emulated cell border signal power is lower at locations closer to an emulated cell outer edge than at more distant locations. Emulated cell border length is sufficient to cause the travelling user equipment to be within the emulated cell border long enough to successfully perform a handover between the first and second cells.

31 Claims, 8 Drawing Sheets

(51) Int. Cl.
*H04W 36/04* (2009.01)
*H04W 52/40* (2009.01)
*H04W 36/36* (2009.01)

(56) References Cited

U.S. PATENT DOCUMENTS

| | | | | |
|---|---|---|---|---|
| 2010/0273504 | A1* | 10/2010 | Bull | G01S 5/02 |
| | | | | 455/456.1 |
| 2012/0004009 | A1* | 1/2012 | Lindoff | H04W 52/0232 |
| | | | | 455/522 |
| 2015/0016290 | A1* | 1/2015 | Griesing | H04W 16/22 |
| | | | | 370/252 |
| 2015/0065145 | A1 | 3/2015 | Huang | |

OTHER PUBLICATIONS

3GPP TSG RAN WG4 Meeting #76, R4-154518, TP Unidirectional RRH arrangement, Aug. 24-28, 2015, 5 pages.
3GPP TSG RAN WG4 Meeting #76bis, R4-155743, Unidirectional RRH Arragenment for HST SFN, Sophia Antipolis, France, Oct. 12-16, 2015, 11 pages.
3GPP TSG RAN WG4 Meeting #76, R4-154520, Evaluation of Unidirectional RRH arrangement for HST SFN, Aug. 24-28, 2015, 3 pages.
3GPP TSG RAN WG4 Meeting #76bis, R4-155758, Priority of controlling interruptions, Sophis Antipolis, France, Oct. 14-16, 2015, 2 pages.
3GPP TSG RAN WG4 Meeting #76 R4-154516, Modified RRH Arrangement for HST SFN, Aug. 24-28, 2015, 13 pages.
3GPP TSG RAN WG4 Meeting #76 bis R4-156658, Handover in Unidirectional SFN, Sophia Antipolis, France, Oct. 14-16, 2015, 4 pages.
3GPP TSR RAN WG4 Meeting #77 R4-158132, TP Handover and Cell reselection in Unidirectional SFN, Anaheim, US, Nov. 16-20, 2015, 2 pages.
PCT International Search Report, mailed Jan. 3, 2017, in connection with International Application No. PCT/EP2016/074459, all pages.
PCT Written Opinion, mailed Jan. 3, 2017, in connection with International Application No. PCT/EP2016/074459, all pages.
3GPP TSG RAN WG4 Meeting #75, R4-153659, Fukuoka, Japan, May 25-29, 2015, Modified arrangement for RRH based model, 8 pages.
3GPP TSG RAN WG4 Meeting #77, R4-157831, Anaheim, US, Nov. 16-20, 2015, Handover and Cell reselection in Unidirectional SFN, 4 pages.
3GPP TSG RAN Meeting #66, RP-141849, Maui, Hawaii (US), Dec. 8-12, 2014 Motivation of New SI proposal: Performance enhancements for high speed scenario, 4 pages.
3GPP TSG RAN WG4 Meeting #76bis, R4-155752, Sophia Antipolis, France, Oct. 14-16, 2015, TP Simulation results for Unidirectional RRH arrangement, pp. 1-15.
3GPP TS 36.213 V12.6.0 Section 10.1.1 (Jun. 2015), 3rd Generation Partnership Project; Technical Specification Group Radio Access Network; Evolved Universal Terrestrial Radio Access (E-UTRA); Physical layer procedures (Release 12), 8 pages.
3GPP TS 36.211 V12.7.0 (Sep. 2015), 3rd Generation Partnership Project; Technical Specification Group Radio Access Network; Evolved Universal Terrestrial Radio Access (E-UTRA); Physical channels and modulation (Release 12), 136 pages.
3GPP TS 36.331 V12.6.0 (Jun. 2015), 3rd Generation Partnership Project; Technical Specification Group Radio Access Network; Evolved Universal Terrestrial Radio Access (E-UTRA); Radio Resource Control (RRC); Protocol specification (Release 12), 449 pages.
3GPP TR 36.878 V2.0.0 (Dec. 2015), 3rd Generation Partnership Project; Technical Specification Group Radio Access Network; Study on performance enhancements for high speed scenario in LTE (Release 13), 19 pages.
3GPP TSG-RAN WG4 Meeting #77, R4-158130, Anaheim, CA, US, Nov. 16-20, 2015, TP for TR 36.878: Uplink characteristics in Unidirectional RRH arrangement, 5 pages.
3GPP TSG RAN WG4 Meeting #77, R4-158133, Anaheim, US, Nov. 16-20, 2015, TP Handover and Cell reselection in Unidirectional SFN, 4 pages.
PCT International Search Report, mailed Jul. 14, 2016, in connection with International Application No. PCT/EP2016/052912, all pages.
PCT Written Opinion, mailed Jul. 14, 2016, in connection with International Application No. PCT/EP2016/052912, all pages.
3GPP TR 36.878 V13.0.0 (Jan. 2016); 3rd Generation Partnership Project; Technical Specification Group Radio Access Network; Study on performance enhancements for high speed scenario in LTE (Release 13); 92 pages.
PCT International Search Report, mailed Jul. 25, 2016, in connection with International Application No. PCT/EP2016/053105, all pages.
PCT Written Opinion, mailed Jul. 25, 2016, in connection with International Application No. PCT/EP2016/053105, all pages.

* cited by examiner

CELL BOUNDARY CROSSING IN A UNIDIRECTIONAL SFN FOR HIGH SPEED TRAINS

CROSS REFERENCE TO RELATED APPLICATIONS

This application claims the benefit of U.S. Provisional Application No. 62/240,286, filed Oct. 12, 2015, which is hereby incorporated herein by reference in its entirety.

BACKGROUND

The present invention relates to connectivity between a user equipment (UE) aboard a high-speed train and network nodes of a cellular communications system, and more particularly to technology that allows handover between different cells to be performed by the UE travelling on a train at high speed.

Depending on relative movement of a UE to a transmitting site, the received signal may display a significant Doppler shift. The Doppler shift forces the UE to increase its demodulation frequency when moving towards the cell, and decrease it when moving away from the cell, the increases/decreases being relative to the carrier frequency used in the network. The cell's antennas experience a similar Doppler shift with respect to the UE's uplink (transmitted) signals. The magnitude of the Doppler shift depends on the relative velocity of the UE towards the transmitting antenna. Deployment of cellular communication system antennas along a train track are particularly problematic because if the transmitting antennas are placed close to the track, the angle between the trajectory of the UE and the line between the UE and the transmitting antennas will be small. Consequently, a substantial part of the UE's velocity will contribute to a Doppler shift, and the higher the speed of the train, the more the Doppler shift. Moreover, there will be an abrupt change of sign of the Doppler shift when the UE passes the transmitting antenna, and the smaller the angle, the more abrupt the change is.

Given an angle, a, between a first vector representing the trajectory of the train (and hence also the UE) in Euclidean three-dimensional space and a second vector (also in Euclidean three-dimensional space) between the train and the transmitting antenna, the Doppler shift can be expressed as $$\Delta f = f\left(\sqrt{\frac{1-\frac{v}{c}}{1+\frac{v}{c}}} - 1\right)$$

where c is the speed of light and v is the relative velocity of the UE (essentially the same as the velocity of the train) towards the transmitting antenna. With an angle α as discussed above and UE velocity, $v_{UE}$, the relative velocity towards the transmitting antenna giving rise to Doppler shift is $v=v_{UE} \cos \alpha$.

To address this problem, a unidirectional beam arrangement has been proposed in, for example, 3GPP TSG-RAN WG4 Meeting #74bis, R4-151365 "Modified arrangement for RRH based model" (Rio de Janiro, Brazil, 20-24 Apr. 2015). Such an arrangement is also disclosed in PCT/EP2015/061759, filed May 27, 2015. With a unidirectional beam arrangement, the variability of the uplink (UL) Doppler shift is essentially zero along the entire track, except close to Remote Radio Head (RRH) sites (i.e., antenna sites), where it is not zero but is still reduced to a fraction of the maximum possible Doppler shift. Such an arrangement and its exemplary performance are illustrated by FIGS. 1A, 1B, 1C, 1D, and 1E.

In order to avoid UE 101 interruptions due to frequency retuning, cells 120, 122, 124 that form a super-cell use an antenna node 110, 112, 114 configuration in which a UE 101 always moves either towards or away from the antenna node 110, 112, 114 with which it communicates. This means the UE 101 will always experience either a positive or a negative Doppler shift, by which passing an antenna node 110, 112, 114 will only mean that a new path with essentially the same Doppler shift is becoming stronger (or weaker, depending on whether the UE is moving away from or towards the antenna node). In FIG. 1A, the example depicts the UE 101 moving westward, so it is moving towards each antenna node with which it communicates. The illustrated UE 101 would move away from each antenna node if it were moving eastward.

FIGS. 1B, 1C, 1D, and 1E depict an example of the Doppler shift and path loss experienced by a wireless communication device and a network node, when the wireless communication device (e.g., UE 101) is moving at a speed of 500 km/h with the communicating antenna node located ahead of the UE, with antenna node inter-site distance of 1000 m, and distance between site and path of 30 m, when using a carrier frequency of 2.7 GHz. More particularly:

FIG. 1A depicts an exemplary UE aboard a train travelling at 500 km/h between RRHs that are spaced 1000 m apart from one another, and located 30 m from the track.

FIG. 1B is a corresponding graph illustrating UE path loss as a function of the UE's position along the track.

FIG. 1C is a corresponding graph illustrating UE tracked frequency as a function of the UE's position along the track.

FIG. 1D is a corresponding graph illustrating RRH path loss as a function of the UE's position along the track.

FIG. 1E is a corresponding graph illustrating RRH received frequency as a function of the UE's position along the track.

For the UE 101 moving towards the second antenna node 112, the path loss of the received downlink signal will gradually decrease as the distance between said device and the downlink transmit antenna(s) comprised in the second antenna node 112 decreases. The UE 101 passes the second antenna node 112 while beginning to receive from the first antenna node 110, and soon the UE 101 is no longer within the beam of the second antenna node 112. Consequently, the signal from the first antenna node 110 is experienced as stronger than the same signal from the second antenna node 112. Hence the wireless communication device will identify a new path, substantially at the same frequency offset as the previous path. The path loss between the first antenna node 110 and the UE 101 is initially at its maximum, but this rapidly reduces as the UE approaches the first antenna node 110.

The instantaneous frequency of the signal received by the wireless communication device (illustrated in FIG. 1C) may display a small spike or ripple when the UE is changing from one downlink beam to another. The magnitude of this momentary disturbance depends on at which angle (as measured between the wireless communication device and the antenna node) the signal transmitted from said antenna node becomes stronger than the signal from the previous antenna node. In the example, the momentary disturbance is about 350 Hz, to be compared with 2500 Hz had there been a switch in a conventional high-speed train scenario with bidirectional split beams.

The unidirectional beam arrangement provides a particular advantage in that it relies solely on network deployment configuration without the need for any accompanying adaptation of UE design.

One may assume that as many cells as possible share the same Physical Cell Identity (ID). There are two possibilities when it comes to RRH arrangement for uplink (UL) reception (RX) and downlink (DL) transmission (TX):

UL RX and DL TX lobes or beams oriented in the same direction (i.e., UL and DL beams both being oriented in a same direction along the track)

UL RX and DL TX lobes oriented in opposite directions (i.e., UL beams being oriented in one direction along the track and DL beams being oriented in an opposite direction along the track). This arrangement is illustrated in FIG. 2. Here, the UE receives DL transmissions from a first RRH (201) and transmits UL signals to an adjacent, second RRH (203).

In deployments having UL RX and DL TX lobes oriented in opposite directions and operating as illustrated in FIG. 2, the received frequency in the base station is essentially the same as the transmitted frequency because the Doppler shifts in the DL and in the UL are the same but with opposite sign, and hence cancel each other out. This is because the UE sets its transmitted UL frequency based on the received DL frequency. Thus, if the UE moves westward (i.e., to the left in the figure), the received DL frequency at the UE will be shifted down from the nominal frequency. The UE sets its UL frequency based on this lowered DL frequency, and the Doppler shift to the RRH 203 is positive, so that the received UL frequency at the RRH 203 will be shifted back to the nominal frequency.

The inventors of the subject matter described herein have come up with a new RRH arrangement for a dedicated Single Frequency Network (SFN) High Speed Train (HST) scenario. See, for example, 3GPP contributions 3GPP TSG RAN WG4 Meeting #76, R4-154518, "TP Unidirectional RRH arrangement" (Aug. 24-28, 2015) and 3GPP TSG RAN WG4 Meeting #76bis, R4-155743, "Unidirectional RRH Arrangement for HST SFN" (Sophia Antipolis, France, Oct. 12-16, 2015) by the inventors. The arrangement is illustrated in FIG. 3, which shows that multiple RRHs (antenna nodes) are configured to form beams having a same orientation with respect to the track of the high-speed train, so that a unidirectional SFN is implemented. The UE receives primarily from one RRH at a time.

The arrangement of FIG. 3 has been shown to significantly improve throughput for a UE traveling at speeds up to at least 750 km/h, by stabilizing the Doppler shift experienced by the wireless communication device (e.g., UE) and thus the Doppler shift experienced by the network node (e.g. eNodeB) on the uplink. See, for example, 3GPP contributions 3GPP TSG RAN WG4 Meeting #76, R4-154520 "Evaluation of Unidirectional RRH arrangement for HST SFN" (Aug. 24-28, 2015) and 3GPP TSG RAN WG4 Meeting #76bis, R4-155758 "Priority of controlling interruptions" (Sophia Antipolis, France, Oct. 14-16, 2015). In addition to the stabilized frequency offsets experienced by wireless communication devices and network nodes, it has also been shown that this RRH arrangement results in negligible inter-carrier interference (ICI) which results in a higher signal to interference ratio (SIR), and low levels of fading, all together leading to a higher carrier to interference and noise ratio (CINR) than otherwise possible. This in turn allows higher modulation orders and less robust encoding to be used; that is, higher order modulation and coding schemes (MCS) can be used. Hence, the system throughput is improved. A thorough analysis can be found in 3GPP contribution 3GPP TSG RAN WG4 Meeting #76, R4-154516, "Modified RRH Arrangement for HST SFN" (Aug. 24-28, 2015).

It is noted that there is also a bi-static version in which UL RX and DL TX are oriented in opposite directions along the track.

FIG. 4 further illustrates a unidirectional RRH arrangement for a SFN network, this time specifically in a HST scenario. A first train 401 is travelling in one direction (e.g., Eastward) and a second train 403 is travelling in an opposite direction (e.g., Westward). Multiple users are onboard each respective train 401, 403. All UEs onboard each respective train experience and exhibit the same Doppler shift characteristics.

An aspect of the above-described arrangements involves extending each cell—as perceived by the UE—as far as possible to reduce the number of times a UE has to change cell (handover or reselection). The actual cell the UE sees while onboard a moving train may be a combined cell and/or several cells in a SFN that all share the same identity. Handovers of UEs are carried out between such cells, but it is handled on the network side without involving the UE.

At some point the UE may have to change cell. This may be because, for example, tracks that have been trunked together split up in different directions at some point, or it may be that the connection between the eNodeB and the RRHs reaches a limit with respect to latency and similar technical considerations.

Handing over to a new cell while travelling at 750 km/h is challenging, particularly if the handover involves an abrupt change in Doppler shift. A UE in general (legacy UE) cannot correctly determine a Doppler shift from one carrier to another that exceeds 2 kHz (so called capture range). This is because a wrap-around in the estimator results in the UE determining wrong frequency offset and consequently tuning its demodulation frequency towards an incorrect target. In many cases this results in radio link failure, by which the UE will have to go through a radio link re-establishment procedure. Radio link failures reduce the system capacity.

It is therefore desirable to provide technology that minimizes the number of occurrences of radio link failure when a UE onboard a high-speed train needs to perform a handover from one cell to another.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology that operates a first network node in a cellular communications network, wherein the first network node is connected to a plurality of first antenna nodes that are located along a track and which provide mobile telecommunications service associated with a first cell, wherein one or more of the first antenna nodes serve an overlap region of the first cell that overlaps an overlap region of a second cell that is associated with a plurality of second antenna nodes that are located along the track and that are connected to a second network node. Such operation includes causing the one or more first antenna nodes to each form downlink beams in a same direction along the track as one another. Transmitter power levels of each of the one or more first antenna nodes are controlled such that:

respective amounts of overlap between the downlink beams and respective power levels of the downlink beams jointly cause the overlap region of the first cell to emulate a cell border for a user equipment travelling at or above a known high speed through the overlap region of the first cell, wherein downlink signal power distributed through the emulated cell border is lower at emulated cell border locations closer to an emulated cell outer edge than at emulated cell border locations more distant from the emulated cell outer edge; and the emulated cell border has a length sufficient to cause the user equipment travelling at the known high speed to be within the emulated cell border for at least a predetermined minimum amount of time necessary to successfully perform a handover from one of the first and second cells to a different one of the first and second cells.

In an aspect of some but not necessarily all embodiments, controlling transmitter power levels of each of the one or more first antenna nodes comprises reading stored configuration data from a nontransitory storage medium.

In an aspect of some but not necessarily all embodiments, the user equipment is one of a plurality of user equipments, each travelling at a respective speed through or approaching the overlap region of the first cell. Here, operation includes selecting, as the known high speed, a highest speed from among the respective speeds of the user equipments. In some but not necessarily all of such embodiments, controlling transmitter power levels of each of the one or more first antenna nodes comprises determining the transmitter power levels of each of the one or more first antenna nodes based on the selected highest speed. In alternative embodiments, operation comprises classifying the selected highest speed as one selected class of a discrete number of classes, and reading stored transmission configuration data indexed by the one selected class.

In an aspect of some but not necessarily all embodiments, operation includes dynamically adjusting how many of the one or more first antenna nodes operate in the overlap region of the first cell based on the known high speed of the user equipment such that the higher the known high speed, the more the number of first antenna nodes that serve the emulated cell border.

In some but not necessarily all of such embodiments, operation includes classifying the high speed of the user equipment as one selected class of a discrete number of classes, wherein dynamically adjusting how many of the one or more first antenna nodes serve the overlap region of the first cell comprises reading configuration data from stored transmission configuration data indexed by the selected class.

In some but not necessarily all alternative embodiments, dynamically adjusting how many of the one or more first antenna nodes operate in the overlap region of the first cell includes adjusting a transmit power level of at least one of the one or more first antenna nodes from an initial level that is less than a nominal maximum transmit power level to an adjusted level that is the nominal maximum transmit power level.

In some but not necessarily all alternative embodiments, dynamically adjusting how many of the one or more first antenna nodes operate in the overlap region of the first cell includes adjusting a transmit power level of at least one of the one or more first antenna nodes from an initial non-zero level to an adjusted level that mutes the one of the one or more first antenna nodes.

In some but not necessarily all alternative embodiments, dynamically adjusting how many of the one or more first antenna nodes operate in the overlap region of the first cell includes gradually decreasing a transmit power level of at least one of the one or more first antenna nodes from an initial non-zero level.

In some but not necessarily all alternative embodiments, operation includes coordinating power levels and/or number of the one or more first antenna nodes with power levels and/or number of one or more second antenna nodes serving the overlap region of the second cell that are associated with the overlap region of the second cell.

In some but not necessarily all of such embodiments, coordinating power levels and/or number of the one or more first antenna nodes with power levels and/or number of one or more second antenna nodes serving the overlap region of the second cell that are associated with the overlap region of the second cell includes the first node communicating with the second node.

In some but not necessarily all alternative embodiments, coordinating power levels and/or number of the one or more first antenna nodes with power levels and/or number of one or more second antenna nodes serving the overlap region of the second cell that are associated with the overlap region of the second cell includes the first node communicating with a core network node other than the second network node, wherein the core network node is not a peer node of the first node.

In an aspect of some but not necessarily all embodiments:

the one or more first antenna nodes are a first set of one or more first antenna nodes that each form downlink beams oriented in a first direction;

the plurality of first antenna nodes comprises a second set of one or more first antenna nodes that are located along the track and which provide the mobile communications service associated with the first cell;

the second set of one or more first antenna nodes each form downlink beams oriented in a second direction that is different from the first direction;

the one or more first antenna nodes comprise one or more transition antenna nodes that provide mobile telecommunications service associated with the first cell and that are located at positions along the track that are between positions at which the first set of first antenna nodes are located and positions at which the second set of first antenna nodes are located; and the transition antenna nodes form a plurality of transitioning downlink beams that vary in orientation from one another such that the user equipment will experience a gradual change in beam orientation as it first passes by one of the first and second sets of one or more first antenna nodes, then passes by the one or more transition antenna nodes and then passes by an other one of the first and second sets of one or more first antenna nodes.

In an aspect of some but not necessarily all embodiments, one or more of the one or more of the first antenna nodes that serve the overlap region of the first cell also serve a surrounding area alongside the track.

BRIEF DESCRIPTION OF THE DRAWINGS

The objects and advantages of the invention will be understood by reading the following detailed description in conjunction with the drawings in which.

DETAILED DESCRIPTION

Figure 1A:
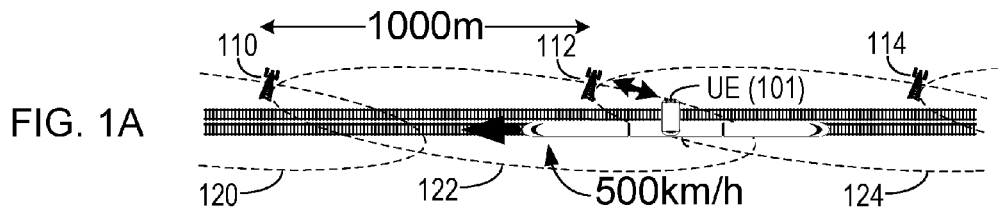
FIGS. 1A through 1E depict various aspects of performance (UE path loss, UE tracked frequency, RRH path loss, RRH tracked frequency) for an exemplary UE aboard a train travelling at 500 km/h between RRHs that are spaced 1000 m apart from one another, and located 30 m from the track.
Figure 1B:
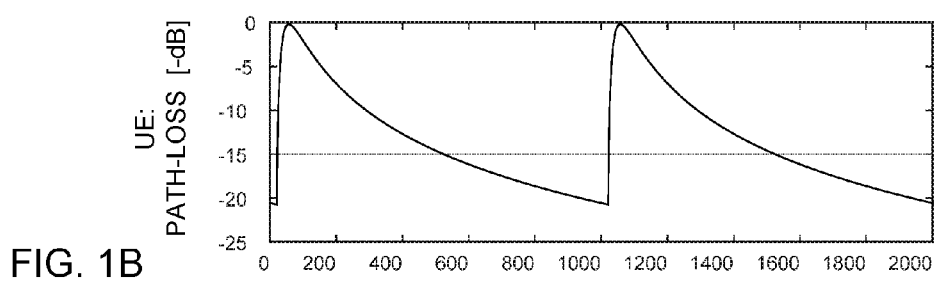
Figure 1C:
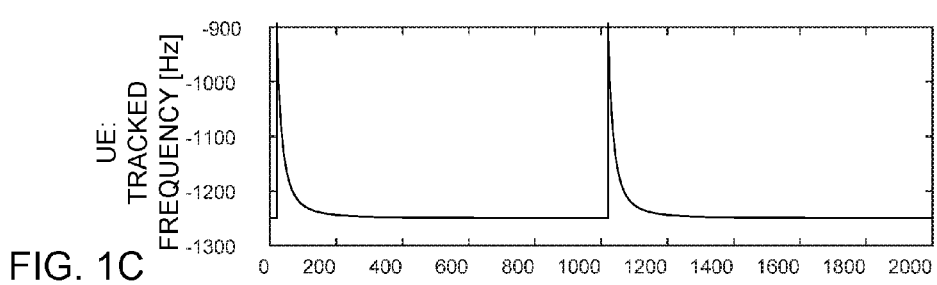
Figure 1D:
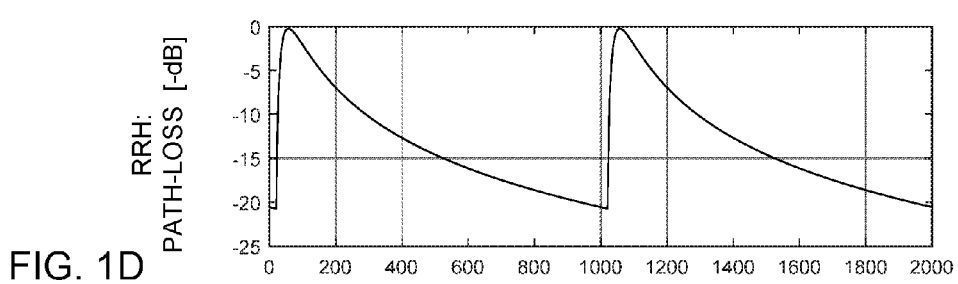
Figure 1E:
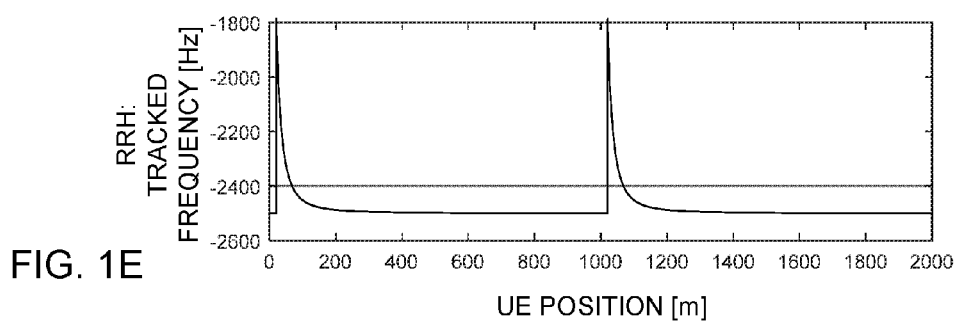
Figure 2:
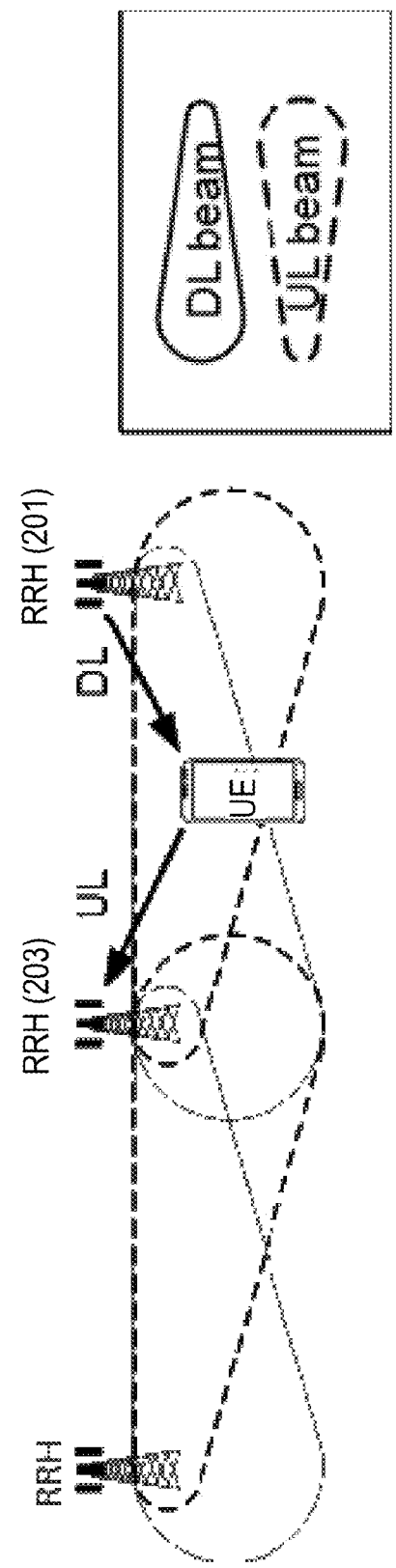
FIG. 2 depicts an arrangement in which UL RX and DL TX lobes are oriented in opposite directions along a track.
Figure 3:
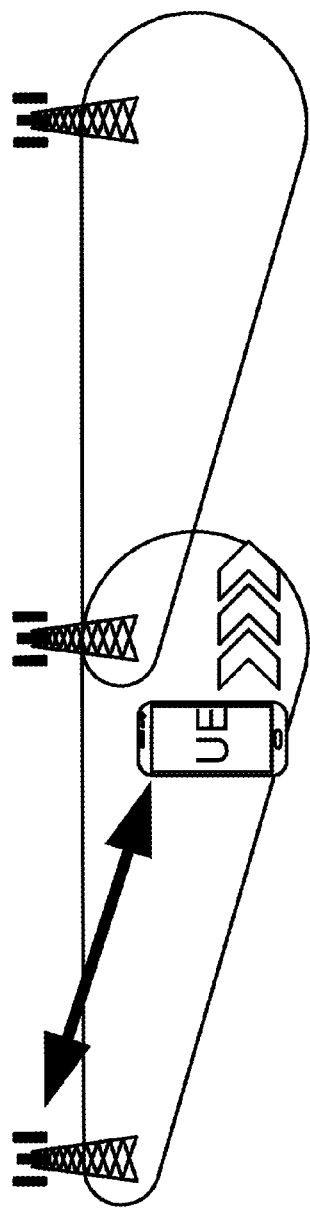
FIG. 3 shows multiple RRHs (antenna nodes) configured to form beams having a same orientation with respect to the track of the high-speed train, so that a unidirectional SFN is implemented.
Figure 4:
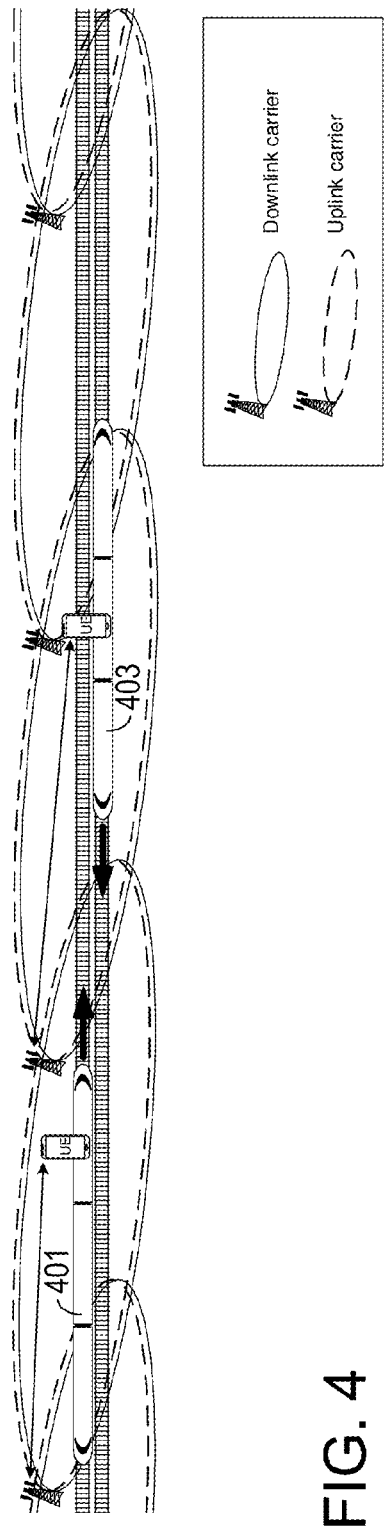
FIG. 4 illustrates a unidirectional RRH arrangement for a SFN network in a HST scenario.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone or in combination with one or more programmed processors). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

With respect to terminology used herein, in some embodiments the non-limiting term UE is used. The UE herein can be any type of wireless device capable of communicating with a network node or another UE over radio signals. The UE may also be a radio communication device, target device, device to device UE, machine type UE or UE capable of machine to machine communication, a sensor equipped with UE, Tablet, mobile terminal, smart phone, laptop embedded equipment (LEE), laptop mounted equipment (LME), USB dongle, Customer Premises Equipment (CPE), and the like.

Also in some embodiments generic terminology, "radio network node" or simply "network node (NW node)", is used. This can be any kind of network node which may comprise any one or more of: a base station, a radio base station, a base transceiver station, a base station controller, a network controller, an evolved Node B (eNB), a Node B, a radio network controller (RNC), a relay node, a positioning node, an Evolved Serving Mobile Location Centre (E-SMLC), a location server, a repeater, an access point (AP), a radio access point, a Remote Radio Unit (RRU), a Remote Radio Head (RRH), a Remote Antenna Unit (RAU), a multi-standard radio (MSR) radio node such as MSR BS nodes in a distributed antenna system (DAS), a SON node, an Operations and Maintenance (O&M) node, an OSS, an MDT node, a Core network node, a Mobility Management Entity (MME), and the like.

The various embodiments described herein are applicable to any Radio Access Technology (RAT) or multi-RAT systems, which involve measurement without gaps and/or multi-carrier operation, such as Long Term Evolution (LTE) Frequency Division Duplex (FDD)/Time Division Duplex (TDD), Wideband Code Division Multiple Access (WCDMA)/High Speed Packet Access (HSPA), Global System for Mobile communication (GSM)/GSM EDGE (Enhanced Data rates for Global Evolution) Radio Access Network (GERAN), Wi Fi, CDMA2000, and the like. The embodiments are also applicable to procedures or radio operations performed by the UE in any Radio Resource Control (RRC) state (e.g., RRC connected state, CELL_DCH state, idle state, idle mode, CELL_PCH, URA_PCH, CELL_FACH etc.).

In some embodiments, aspects utilized in Single Frequency Networks (SFNs) are employed. In an SFN, multiple network nodes transmit the same information on the same carrier frequency and use the same cell identity in an area that may be wider than a single node can cover. Although traditionally used in LTE deployments for multicast broadcast, the term has been extended in recent 5G studies conducted by the Third Generation Partnership Project (3GPP) to also include dedicated communication in a cell that may be managed by several network nodes in a cooperative manner, where the wireless communication device is aware only of being in a particular cell and not aware of which network node it is communicating with. An SFN may involve several eNodeBs.

In some embodiments, aspects involve the use of a combined cell, which is a cell comprising a network node with multiple antenna nodes, with fully or partially overlapping coverage. In its simplest form a combined cell corresponds to an SFN with the same information transmitted from all antenna nodes, and in more elaborate forms time and frequency resources may be reused for example, in spatial diversity multiplexing schemes. A combined cell may be a special case of an SFN with only one eNodeB managing the SFN cell.

In an aspect of embodiments consistent with the invention, a network arrangement is provided along a HST track for providing cellular communications service to one or more UEs on board a high-speed train. In order to facilitate handover from one cell to another at high speed, the technology phases out a source cell and phases in an intra-frequency target cell in such manner that an abrupt Doppler shift is avoided although the UE is travelling at high speed, for example 750 km/h. The arrangement is configured such that it does not matter which of the two cells is source cell and target cell, respectively. Put in other words, it does not matter whether the UE is travelling towards or against the beams when crossing the border between the cells—in both cases the UE will have sufficient time to detect the new cell and report it or reselect it.

In another aspect of embodiments consistent with the invention, the technology emulates a cell border (e.g., combined cell border, SFN cell border) by deploying the cells sufficiently close together and by providing a location-dependent gradient of source cell downlink transmit power in which the source cell downlink transmit power decreases in the direction away from the source cell (i.e., towards an emulated source cell border while still in the source cell) while providing a location-dependent gradient of target cell downlink transmit power in which target cell downlink transmit power increases in the direction towards the target cell (i.e., away from an emulated target cell border while in the target cell), with the power gradients extending over one or several inter-site distances. In the case of multiple inter-site distances, the change in power ratio between the source and target cell may be carried out gradually; that is, different ratio can apply over different inter-site distances.

Thus, the Doppler shift change experienced by a UE travelling on a high-speed train will be the same when crossing an emulated cell border as when moving between RRHs within a combined/SFN cell, which, as mentioned above, is essentially zero.

Apart from small-scale fading the power ratio remains constant over each inter-site distance regardless of UE position, achieved e.g. by transmitting both source and target cells from the same mast. This piecewise constant ratio simplifies configuration of thresholds for event-triggered reporting and thresholds for cell re-selection.

These and other aspects will now be described in further detail.

Embodiments of the invention concern how to have a UE move from a source cell, with a given Physical Cell Identity x (PCIx), to a target cell having a different Physical Cell Identity, PCIy, in a SFN network deployed along a high-speed train track without experiencing an abrupt change in Doppler shift, or suddenly losing coverage from the source cell when entering the target cell.

In the conventional unidirectional network deployment as described in the Background section of this document, a UE is travelling either towards or away from the transmitting RRH (antenna node). From a mobility perspective, a UE that is crossing a cell border (i.e., geographic locations where adjacent cells have different physical cell identities (PCIs)), would, if going in the direction towards the transmitting RRH, lose serving cell coverage before receiving the handover command since it would go from a very strong signal from its source cell to a weak signal from the target cell in a short moment. This would result in radio link failure, causing the UE to have to try to re-establish the radio link, this time to the target cell. If going in the other direction, a UE would go from a weak source cell signal to a strong target cell signal and would, due to interference, not be able to receive a handover command from the source cell, with radio link failure as result.

Embodiment 1

Figure 5:
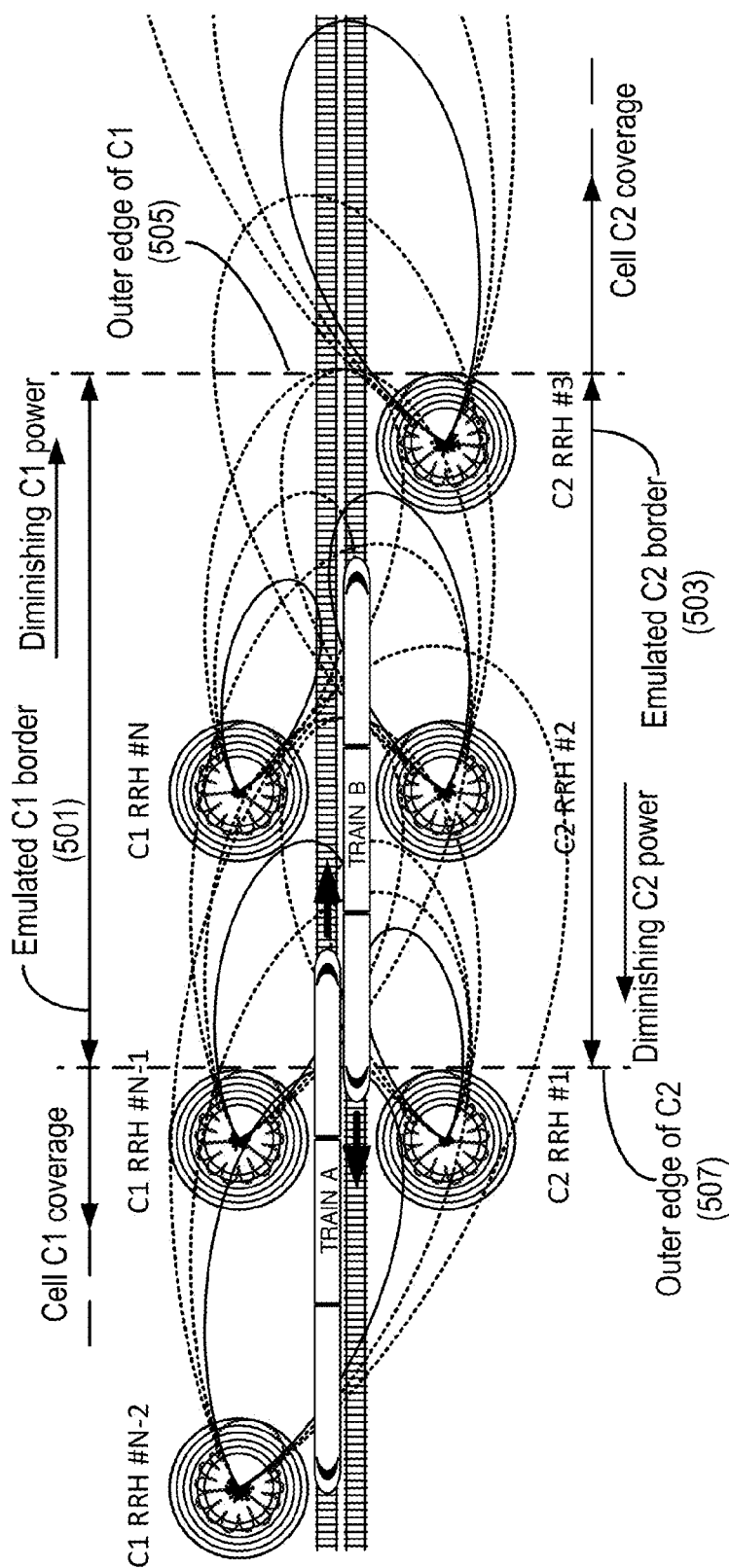
FIG. 5 illustrates a deployment in which both source and target cells overlap each other over a stretch of two inter-site distances along a track.

Thus, in Embodiment 1 the source cell and the target cell overlap each other over, without limitation, one or more inter-site distances ("site" here refers to antenna node sites). Other arrangements with other distances and relative positions of RRH transmitters from source and target cells are not precluded—the use of overlap is common to all of these embodiments. The arrangement is illustrated in FIG. 5 for a deployment in which both source and target cells overlap each other over a stretch of two inter-site distances. In one case the cell C1 (combined cell or SFN cell comprising RRHs with prefix C1) is the target cell for Train B, and cell C2 is the source cell. In the other case (i.e., for Train A) it is vice versa. It shall be noticed that the cells C1 and C2 can be target and source cells simultaneously—it depends only on which direction the UE (onboard a train) is heading in.

In order to emulate a cell border, different power ratios may be applied between cell C1 and C2. Further, the power ratios may depend on which segment (inter-site distance) the UE resides in at the moment. This means that the UE will experience different power ratios as it passes through the emulated cell border.

Particularly, for the exemplary arrangement depicted in FIG. 5, C1 RRH#N−2 and C2 RRH#3 may each use an exemplary (transmitter, TX) power level $P_{TX,1}$. The antenna nodes C1 RRH#N−1 and C2 RRH#2 may use a power level $P_{TX,2}=P_{TX,1}-B_2$ dBm and the antenna nodes C1 RRH#N and C2 RRH#1 may use a power level $P_{TX,3}=P_{TX,1}-B_3$ dBm, where $B_2$ and $B_3$ are power backoff levels. The power level $P_{TX,1}$ and the power backoff levels $B_2$ and $B_3$ may be selected such that a particular minimum SINR is achieved for each of cells C1 and C2, respectively, in each segment (inter-site distance). Particularly, the minimum SINR may be chosen such that a UE still can communicate with the source cell while detecting the target cell.

A number of aspects can be seen in the exemplary embodiment depicted in FIG. 5. The antenna nodes C1 RRH#N−2, C1 RRH#N−1, and C1 RRH#N are all associated with the cell C1, and serve an overlap region of the cell C1 that is called so because it overlaps an overlap region of the cell C2 that is associated with the antenna nodes C2 RRH#1, C2 RRH#2, and C2 RRH#3.

In another aspect, the illustrated antenna nodes C1 RRH#N−2, C1 RRH#N−1, and C1 RRH#N, as well as the antenna nodes C2 RRH#1, C2 RRH#2, and C2 RRH#3, all form downlink beams in a same direction along the track as one another. Further, transmitter power levels of each of the antenna nodes of the cell C1 are controlled such that respective amounts of overlap between the downlink beams and respective power levels of the downlink beams jointly cause the overlap region of the first cell to emulate a cell border 501 for a user equipment travelling at or above a known high speed through the overlap region of the first cell. Downlink signal power distributed through the emulated cell border 501 is lower at emulated cell border locations closer to an emulated cell outer edge (reaching as far as antenna site C1 RRH#N's signal) than at emulated cell border locations more distant from the emulated cell outer edge 505.

A similar description can be made for the illustrated antenna nodes C2 RRH#1, C2 RRH#2, and C2 RRH#3, with the orientation of the emulated cell C2 border 503 and emulated cell outer edge 507 being in a direction opposite that of C1.

As will be further discussed, each emulated cell border has a length sufficient to cause the user equipment travelling at a known high speed to be within each cell's emulated cell border for at least a predetermined minimum amount of time necessary to successfully perform a handover from one of the first and second cells C1, C2 to a different one of the first and second cells C2, C1.

In a very simple example, where it is assumed that the RRHs are identical and that they are placed at equidistant spacing, 3 dB could be selected for the power backoff levels B2 and B3, by which source cell and target cell would have a SIR of 0 dB. With $P_{TX,1}$ selected such that SNR is above 0 dB when farthest away from the transmitting RRH, the SINR will be above −3 dB. The significance of SINR equal to −3 dB is that a UE has to be able to operate at this level since in regular network deployments it can find itself in the intersection of 3 cells that are received at equal strength. Additionally, with respect to cell detection, an intra-frequency neighbor cell is considered detectable when the SINR exceeds −6 dB.

Referring again to FIG. 5, the phasing in and out of cells C1 and C2 is shown. For each RRH, the solid line indicates the part of a beam where the power is high, for example, above a particular value (e.g., specified in dBm). The dotted lines emanating from each RRH indicate −3 dB (inner) and −6 dB (outer) lower received power levels. The shapes of the beams indicate the coverage areas. For each RRH, the antenna radiation pattern is shown inside the circle. Note that the RRHs C2 RRH#1 and C1 RRH#N−1 may be mounted on the same mast; the same can be the case for RRHs C2 RRH#2 and C1 RRH#N.

In another simple example, the power backoff levels B2 and B3 may be selected differently, to provide a gradual decrease of source cell while increasing target cell. For instance, B2 and B3 could be selected to achieve a SIR that is larger than 3 dB for the target cell, and larger than −3 dB for the source cell, such that the target cell is detectable while not interfering too much with the communication in the source cell.

In case the total power transmitted over a segment can be increased for the area where cells overlap, one may for instance use power backoff levels B2 and B3 equal to 0 dB which would lead to SIR being 0 dB but would increase the SINR since the signals still maintain their margin to the noise floor.

The same principle as described above can be applied for varying inter-site distances and varying transmit power levels (individual or between cells). The principle is that the emulated cell border is engineered to have certain properties and to trigger a certain UE behavior that legacy UEs can be expected to perform.

Further aspects will be made apparent from the following example that is in accordance with Embodiment 1: Suppose the power backoff levels B2 and B1 have been selected to be 1.76 dB and 4.77 dB, respectively. The source cell power that a UE would see as it passes through the emulated cell border would be $P_{TX,1}$ (before), $P_{TX,1}-1.76$ dBm (in first overlapped segment), and $P_{TX,1}-4.77$ dBm (in the last overlapped segment). At the same time, the target cell would be seen as $P_{TX,1}-4.77$ dB m (in the first overlapped segment), $P_{TX,1}-1.76$ dBm (in the second overlapped segment), and $P_{TX,1}$ (afterwards, in the target cell). The SIR for the source cell would be 3 dB in the first overlapped segment and −3 dB in the second overlapped segment. For the target cell it is vice versa: −3 dB and 3 dB.

In some but not necessarily all embodiments, there may be only one overlapped segment between the two cells (e.g., between C1 and C2)—particularly if the inter-site distance is long enough with respect to the speed at which UEs are travelling for allowing UEs to detect the cell and trigger events or evaluate for reselection before leaving the overlapped segment.

Embodiment 2

Figure 6:
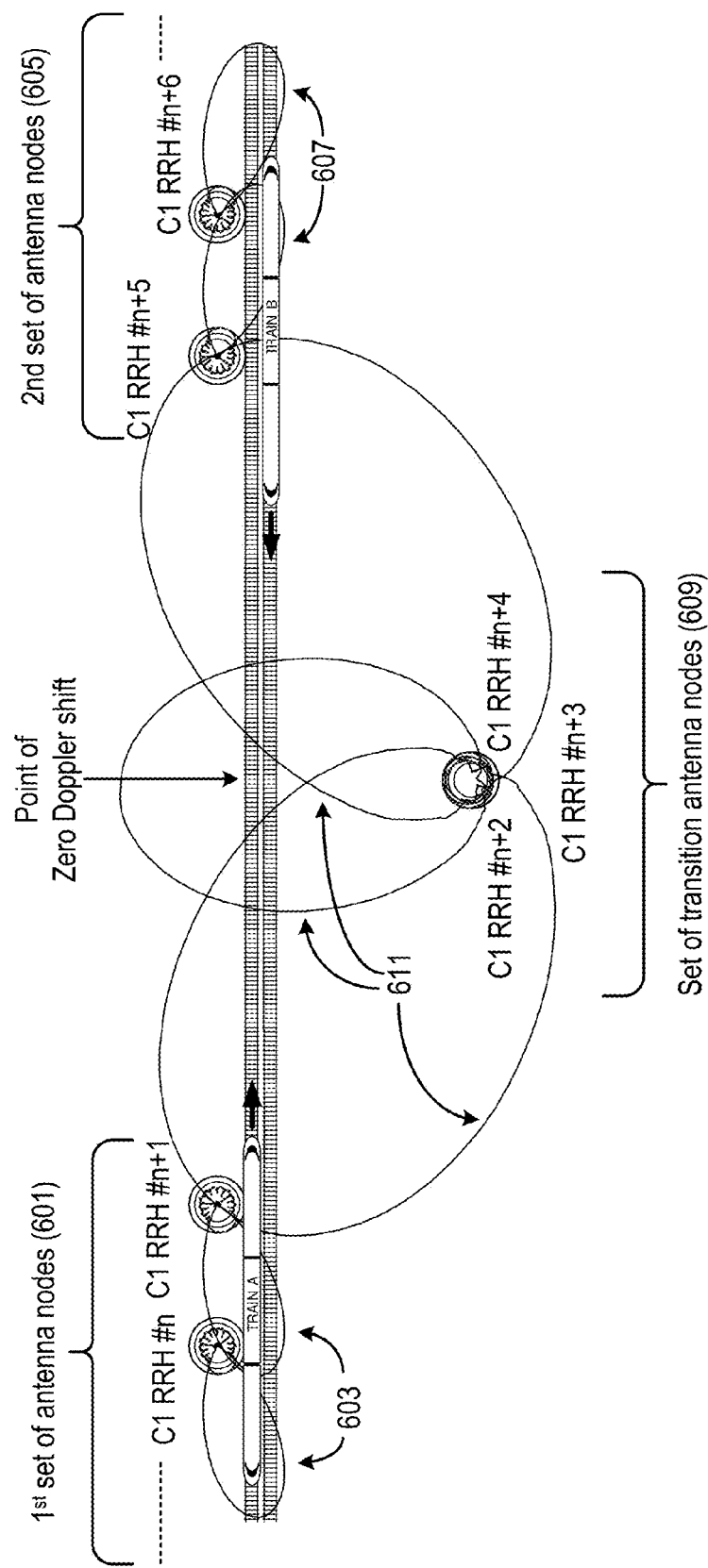
FIG. 6 illustrates the use of transition antenna nodes to connect antenna nodes having beams aimed in one direction, with other antenna nodes having beams aimed in a different direction.

In another aspect of some but not necessarily all embodiments, connecting two or more SFN networks with unidirectional RRH arrangements may require a mechanism that (statically) changes the direction of the beams. In such cases, the separate networks have different orientations of antenna nodes at the cell boundaries, thereby hampering their ability to meet as discussed above with respect to Embodiment 1. To address this situation, a section of a bidirectional network is inserted to change the orientation of one of the networks and thereby connect one part of the network (with beams oriented one way), with another part of the network (with beams oriented in a different way). In such cases one may for instance use RRHs with wider lobes and further away from the track, as illustrated in FIG. 6. The UE will then gradually adjust to changing Doppler conditions when passing the cell site comprising RRHs C1 #n+2, C1 #n+3 and C1 #n+4. The UE enters from (or leaves to) a beam that is aligned in the same direction, and gradually experiences decreasing (or increasing) Doppler shift until it is at the position closest to a cell site (e.g., position marked in the figure), by which it has zero Doppler shift. When passing this point it is vice versa; the Doppler shift gradually increases as it leaves the cell site.

Thus, the bidirectional network section will gradually change the Doppler shift experienced by the UE from plus to minus or vice versa, depending on its travelling direction.

The arrangement depicted in FIG. 6 is merely an example; one may use fewer (e.g. two antennas covering 120° each) or more (e.g. several narrow beams arranged as a fan) antenna beams to provide the coverage. The power level of each such beam may be adjusted individually for the needed coverage. For instance, the middle RRH #n−3 shown in FIG. 6 uses 3 dB lower transmission power than the outermost two RRHs #n+2 and #n+4.

More generally, a cell (such as the cell C1 illustrated in FIG. 6) can be served by a first set 601 of one or more antenna nodes that each form downlink beams 603 oriented in a first direction.

The cell is further served by a second set 605 of one or more antenna nodes that are located along the track and which provide the mobile communications service associated with the first cell. The second set 605 of one or more antenna nodes each form downlink beams 607 oriented in a second direction that is different from the first direction.

In order to connect these with minimal impact from changes in Doppler shift, the cell is additionally served by one or more transition antenna nodes 609 that provide mobile telecommunications service associated with the first cell and that are located at positions along the track that are between positions at which the first set 601 of first antenna nodes are located and positions at which the second set 605 of first antenna nodes are located.

The transition antenna nodes 609 form a plurality of transitioning downlink beams 611 that vary in orientation from one another such that the user equipment (onboard a train) will experience a gradual change in beam orientation as it first passes by one of the first and second sets 601, 605 of one or more antenna nodes, then passes by the one or more transition antenna nodes 609 and then passes by an other one of the first and second sets 605, 601 of one or more first antenna nodes.

Embodiment 3

In another aspect of some but not necessarily all embodiments, the number of segments (i.e., areas between adjacent RRHs) that are overlapped by means of phasing in/phasing out as in Embodiment 1 depends on the speed of UEs approaching from either direction. In case UEs are approaching at low speed, they remain within any given segment for a longer amount of time than at high speed. Consequently, they will have enough time to detect the target cell and trigger events or evaluate for cell reselection using fewer overlapping segments than they would if they were approaching at high speed. For instance, a UE approaching at 250 km/h takes twice the time to travel one segment (inter-site distance) than a UE travelling at 500 km/h. Hence it has longer time to detect the target cell.

Suppose for instance that to support speeds up to 500 km/h two segments have to be provided, potentially both with power backoff levels B2 and B3 of 3 dB (half power for source cell, half power for target cell). When the fastest UE approaches the target cell at 250 km/h or less, one of the overlapping segments may be dynamically configured to mute the source or target cell, and the other to use B2 of 0 dB (i.e., no backoff applied to the signal). In this case the border between the cells thus becomes shifted one segment from one of the directions. A benefit is that the added interference and the lowered transmission power can be avoided in one of the segments, thereby allowing a higher modulation and coding scheme to be used and thus a higher system throughput to be achieved. If on the other hand the fastest UE is approaching at 500 km/h—then two segments constitute the handover zone. And if the fastest UE is approaching at 750 km/h, three segments constitute the handover zone. This arrangement may be used for cell borders near stations or junctions where some trains maintain low speed and some pass at full speed.

More generally, this aspect involves dynamically adjusting how many of a given cell's antenna nodes operate in the overlap region of the cell based on the speed of the UEs, such that the higher the known high speed, the more the number of antenna nodes that serve the emulated cell border.

Embodiment 4

In another aspect of some but not necessarily all embodiments consistent with the invention, the SFN network serves not only trains, but also the surrounding areas alongside a track. This may be for passengers waiting at platforms, maintenance workers, or the general population living close to the tracks.

The neighboring eNodeBs at a combined cell and/or SFN cell border exchange information regarding whether any UEs are approaching at high speed (e.g., faster than 100 km/h). If so, they may maintain a handover zone comprising overlapped segments (inter-site distances) according to Embodiments 1 or 3. When no UE is travelling at high speed, the eNodeBs (or a central network node) may decide that no handover zone is needed, by which the transmission power gradually is adjusted in one or more of the overlapped segments to have UEs being handed over to or reselect C1 (or C2 depending on strategy). Eventually only one cell is maintained in each segment (either C1 or C2), with the benefit being that (nearly) stationary users will not suffer from the lowered signal power and increased interference that results in a handover zone. Hence stationary users will experience better radio conditions so that higher modulation and coding schemes than otherwise possible can be used. This will result in increased system capacity.

Figure 7:
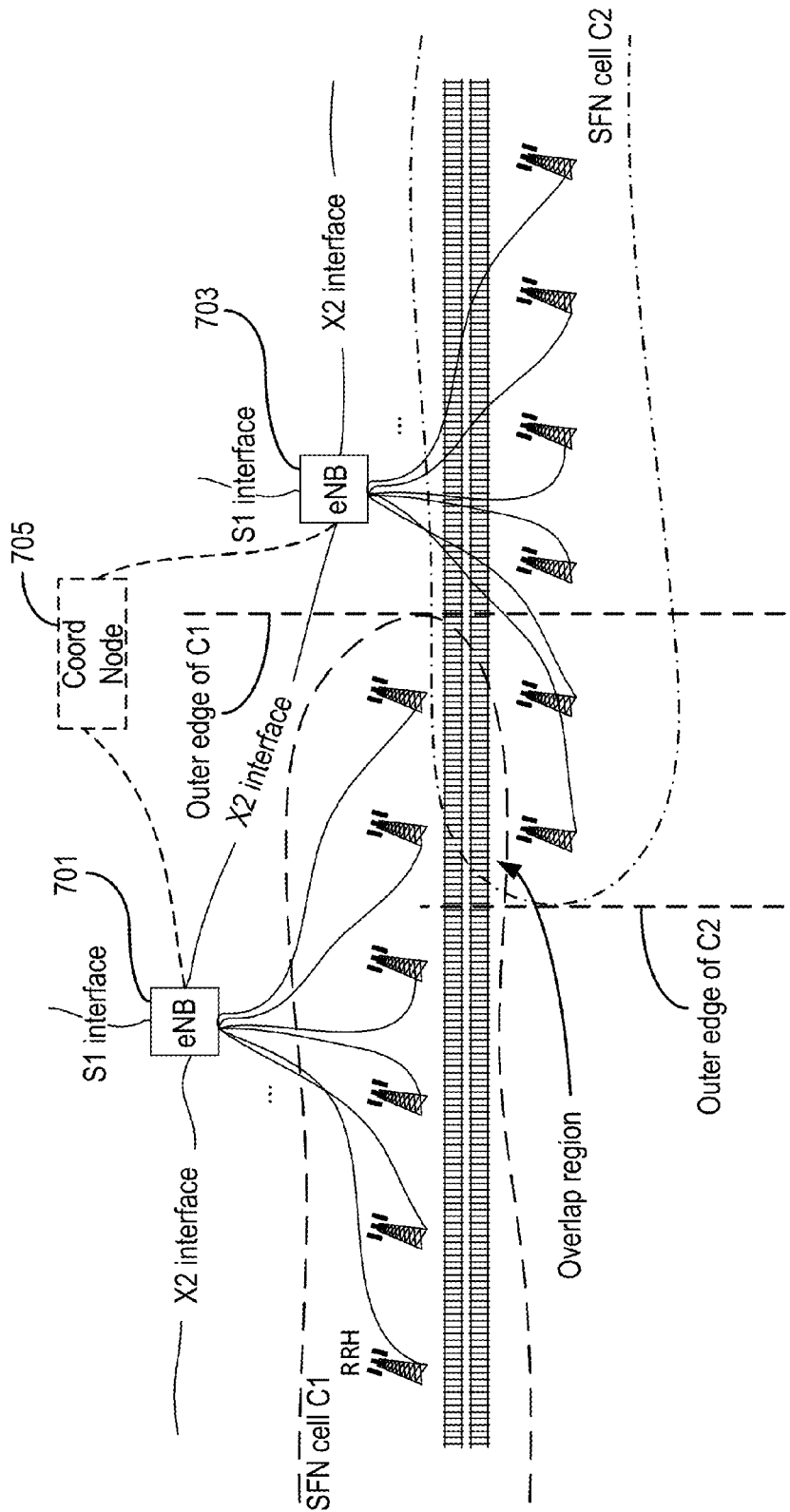
FIG. 7 depicts a network architecture for providing communications service as described herein.

To illustrate additional aspects of some but not necessarily all embodiments consistent with the invention, FIG. 7 depicts a network architecture for providing communications service as described above. Each eNB 701, 703 is connected to multiple RRHs. Several eNBs may span an SFN cell group with the same physical cell identity with handovers hidden for the UE but handled via the X2 interface. At borders between SFN cell groups, the UE will identify the target cell group, and a regular handover will occur. In embodiments utilizing dynamic power levels for overlapping RRHs coordination between eNBs may be handled by a coordinating network node 705 and/or the bordering eNBs 701, 703 may themselves handle coordination via information exchange over X2.

Figure 8:
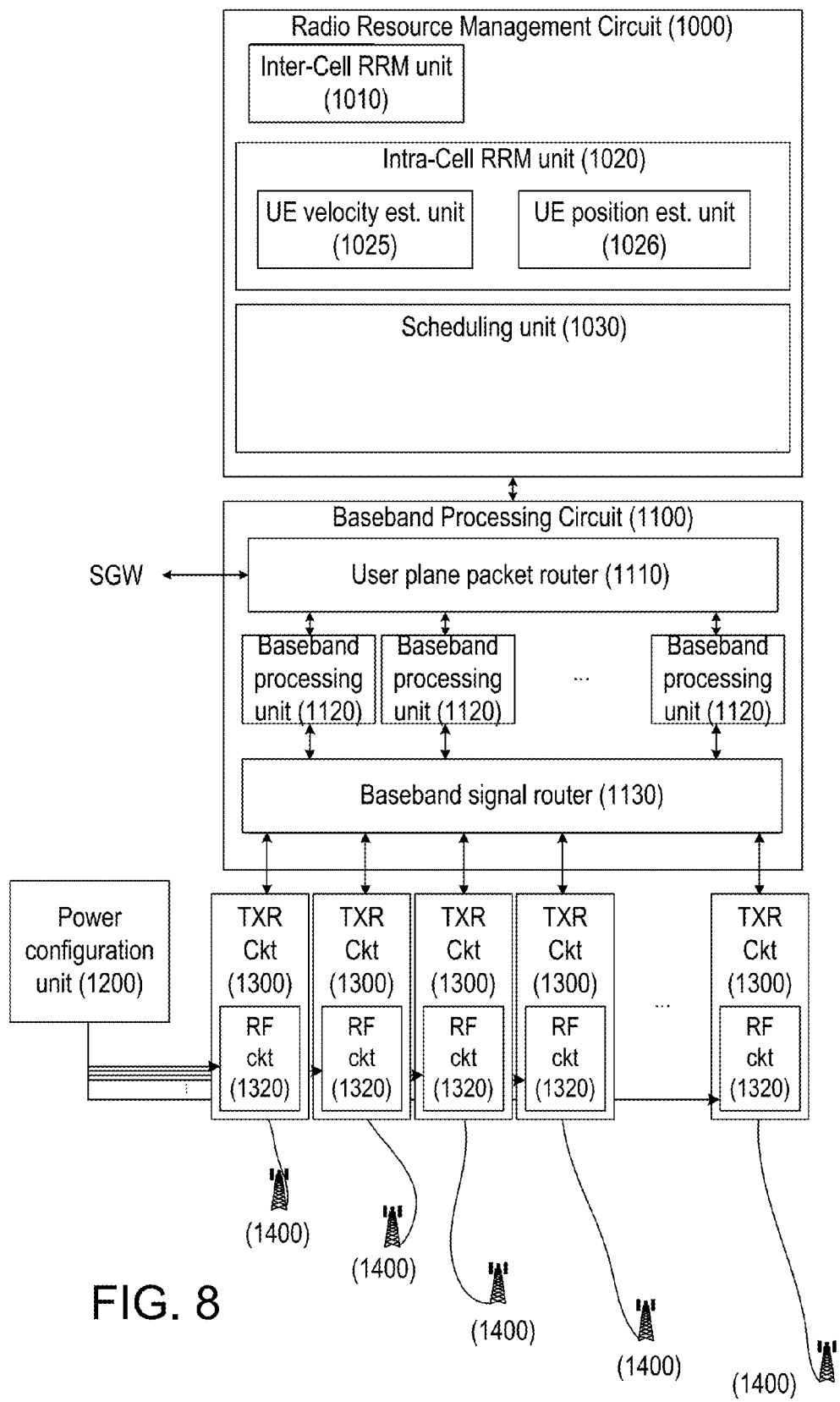
FIG. 8 illustrates an exemplary eNB architecture for carrying out various aspects as described herein.

FIG. 8 illustrates an exemplary eNB architecture for carrying out various aspects as described above. In overview: An inter-cell Radio Resource Management (RRM) unit 1010 handles information exchange regarding mobility with neighboring cells (in the same and in some cases in other SFN cell groups or combined cells). An intra-RRM unit 1020 handles mobility within the segments spanned by RRHs connected to this eNB. UE velocity is monitored by a UE velocity estimation unit 1025 and UE position is monitored by a UE position estimation unit 1026. RRHs may be turned on and off as needed (e.g., for saving power). A power configuration unit 1200 configures the transmission (TX) power for each RRH. How configurations are made depends on which embodiment is considered. The person of ordinary skill in the art will readily be able to make suitable adaptations based on the description provided herein.

The exemplary arrangement of FIG. 8 will now be described in further detail. The functional blocks of the arrangements that are illustrated in FIG. 8 may be comprised in a network node, a base station such as an eNodeB, a RRH, a RRU, and the like as will be exemplified. The arrangements in FIG. 8 may be comprised in and/or correspond to any of the arrangements (nodes, etc.) discussed above in connection with FIGS. 1 to 7.

Radio Resource Management (RRM) circuit 1000:

The RRM circuit 1000 may be deployed in an eNodeB and contains and inter-Cell RRM unit 1010, an Intra-Cell RRM unit 1020, and a Scheduling unit 1030.

The Inter-Cell RRM 1010 unit handles handovers to cells outside the present cell.

The Intra-Cell RRM 1020 unit handles the mobility within the cell, including tracking and mapping of UEs into segments and mapping of segments to two or more physical sites. Since the group of UEs is moving, the mapping of segment to physical sites changes over time. A segment can beneficially be mapped to two physical sites because, at some point, the group of UEs will cross a border between sites and this crossing should be seamless.

The Intra-Cell RRM unit 1020 further keeps track of whether segments overlap each other, by which it provides information to the Scheduling unit 1030 so it can take into account that resources at the concerned physical sites are to be shared between UEs in two (or more) segments. Moreover, when a segment is approaching a cell border, the Intra-Cell RRM unit 1020 notifies the Inter-Cell RRM unit 1010 which then prepares handovers to neighbor cell(s).

Scheduling Unit 1030:

The scheduling unit 1030 contains information about one or more segments where information and allocations for UEs mapped to each respective segment are stored. Each segment page can be viewed as a large registry or memory page. This is where the allocations and scheduling of individual UEs is handled.

Baseband Processing Circuit 1100:

The Baseband Processing circuit 1100 may be deployed in an eNodeB and comprises a User plane packet router 1110 which routes UE-specific packets from a Serving Gateway (SGW) to Baseband processing units 1120 assigned to the respective segment to which the UE belongs. There is one Baseband processing unit 1120 per segment; thus each baseband processing unit 1120 serves two or more dynamically assigned physical sites (e.g. antenna sites/cell sites/antenna nodes). Segments that overlap, fully or partially, are handled by a single Baseband Processing Unit 1120.

The Baseband Processing circuit 1100 further contains a Baseband Signal Router 1130, which relays the baseband signals to and from RF circuits 1320 for each physical site, based on the segment-to-site mapping determined by the Intra-Cell RRM unit 1020.

Transceiver Circuit 1300:

There is one transceiver circuit 1300 per physical site (e.g. antenna site/cell site/antenna node), deployed in, for example, a RRU or RRH. The transceiver circuit 1300 may contain Delay circuitry (not shown), allowing the DL and UL timing to be shifted compared to the neighboring sites. Moreover the transceiver circuit contains an RF circuit 1320 that modulates baseband signals to radio Antennas Nodes 1400:

Each cell site is served by an Antenna node 1400, where all antenna nodes 1400 form lobes in the same direction along a path/track (as discussed above), with the exception of any transition antenna nodes 609 that may be present, as discussed above.

The distance between antenna nodes 1400 and the signal power levels are tuned such that a first antenna node forms a lobe that is oriented in the same direction along the track as the lobe of a second adjacent antenna node, the second antenna node forms a lobe that is oriented in the same direction relative the tracks as the lobe of a third antenna node, and so on as discussed in detail above. Power levels are such that standardized side conditions for cell detection and demodulation are met regardless of where the UE is situated between any of the antenna nodes. Moreover, power levels of antenna nodes that serve an overlap region are adjusted as discussed earlier in detail.

Further aspects of various embodiments consistent with the invention will now be discussed with reference to FIG. 9, which is, in one respect, a flow chart of steps/processes performed by circuitry in accordance with some but not necessarily all exemplary embodiments consistent with the invention. In another respect, FIG. 9 can be considered to depict exemplary means 900 comprising the various illustrated circuitry (e.g., hard-wired and/or suitably programmed processor) configured to perform the described functions.

Figure 9:
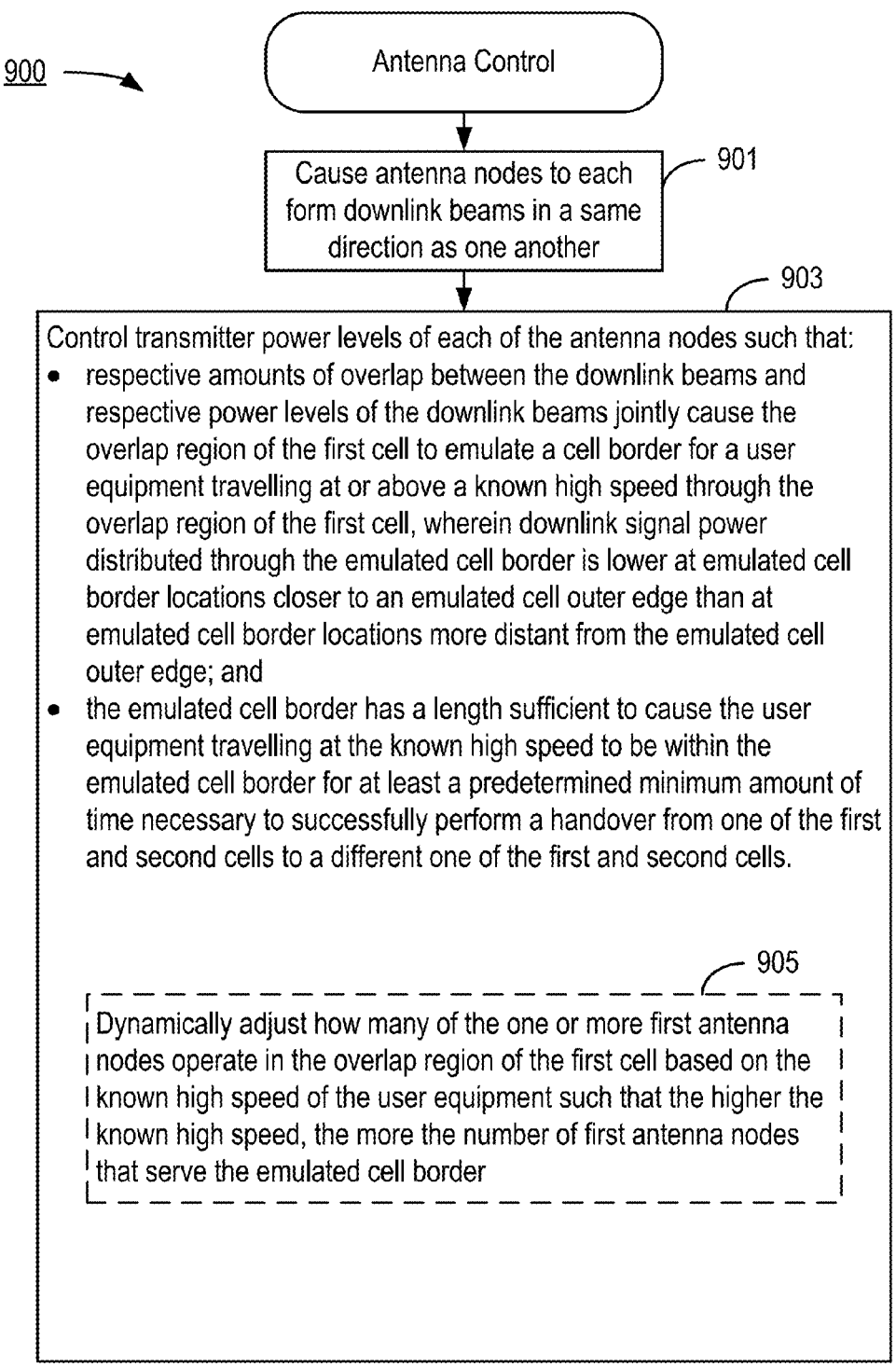
FIG. 9 is, in one respect, a flow chart of steps/processes performed by circuitry in accordance with some but not necessarily all exemplary embodiments consistent with the invention.

The functionality illustrated in FIG. 9 is performed by circuitry in a controller that is associated with a node, such as but not limited to an eNodeB or a controller node that communicates with an eNodeB. The functionality is that of operating a first network node in a cellular communications network, wherein the first network node is connected to a plurality of first antenna nodes that are located along a track and which provide mobile telecommunications service associated with a first cell, wherein one or more of the first antenna nodes serve an overlap region of the first cell that overlaps an overlap region of a second cell that is associated with a plurality of second antenna nodes that are located along the track and that are connected to a second network node. Such operation includes causing the one or more first antenna nodes to each form downlink beams in a same direction along the track as one another (step 901).

Transmitter power levels of each of the one or more first antenna nodes are controlled (step 903) such that respective amounts of overlap between the downlink beams and respective power levels of the downlink beams jointly cause the overlap region of the first cell to emulate a cell border for a user equipment travelling at or above a known high speed through the overlap region of the first cell, wherein downlink signal power distributed through the emulated cell border is lower at emulated cell border locations closer to an emulated cell outer edge than at emulated cell border locations more distant from the emulated cell outer edge (step 903). Further, the emulated cell border has a length sufficient to cause the user equipment travelling at the known high speed to be within the emulated cell border for at least a predetermined minimum amount of time necessary to successfully perform a handover from one of the first and second cells to a different one of the first and second cells.

In some but not necessarily all embodiments (indicated as "optional" by the dashed lines in FIG. 9), control further includes dynamically adjusting how many of the one or more first antenna nodes operate in the overlap region of the first cell based on the known high speed of the user equipment such that the higher the known high speed, the more the number of first antenna nodes that serve the emulated cell border (step 905).

Embodiments in accordance with the invention provide advantages over conventional technologies. For example:

UEs travelling onboard high speed train, served by a SFN with unidirectional RRH arrangement, are able to detect a target cell regardless of the direction in which the UE is heading along the track.

UEs can be handed over to an intra-frequency neighbor cell without experiencing an abrupt Doppler shift.

UEs are able to reselect an intra-frequency neighbor cell without experiencing an abrupt Doppler shift.

As a result, a UE onboard a high speed train (or similar vehicle) can travel from point A to point B across several different combined cells and/or SFN cells without experiencing an abrupt Doppler shift. Hence the risk for radio link failure is reduced and therefore the system capacity increased.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

What is claimed is:

1. A method of operating a first network node in a cellular communications network, wherein the first network node is connected to a plurality of first antenna nodes that are located along a track and which provide mobile telecommunications service associated with a first cell, wherein one or more of the first antenna nodes serve an overlap region of the first cell that overlaps an overlap region of a second cell that is associated with a plurality of second antenna nodes that are located along the track and that are connected to a second network node, the method comprising:
causing the one or more first antenna nodes to each form downlink beams in a same direction along the track as one another;
controlling transmitter power levels of each of the one or more first antenna nodes such that:
respective amounts of overlap between the downlink beams and respective power levels of the downlink beams jointly cause the overlap region of the first cell to emulate a cell border for a user equipment travelling at or above a known high speed through the overlap region of the first cell, wherein downlink signal power distributed through the emulated cell border is lower at emulated cell border locations closer to an emulated cell outer edge than at emulated cell border locations more distant from the emulated cell outer edge; and
the emulated cell border has a length sufficient to cause the user equipment travelling at the known high speed to be within the emulated cell border for at least a predetermined minimum amount of time necessary to successfully perform a handover of cellular communication service for the user equipment from one of the first and second cells to a different one of the first and second cells.

2. The method of claim 1, wherein controlling transmitter power levels of each of the one or more first antenna nodes comprises reading stored configuration data from a nontransitory storage medium.

3. The method of claim 1, wherein:
the user equipment is one of a plurality of user equipments, each travelling at a respective speed through or approaching the overlap region of the first cell; and
the method comprises selecting, as the known high speed, a highest speed from among the respective speeds of the user equipments.

4. The method of claim 3, wherein:
controlling transmitter power levels of each of the one or more first antenna nodes comprises determining the transmitter power levels of each of the one or more first antenna nodes based on the selected highest speed.

5. The method of claim 3, comprising:
classifying the selected highest speed as one selected class of a number of classes; and
reading stored transmission configuration data indexed by the one selected class.

6. The method of claim 1, comprising:
dynamically adjusting how many of the one or more first antenna nodes operate in the overlap region of the first cell based on the known high speed of the user equipment such that the higher the known high speed, the more the number of first antenna nodes that serve the emulated cell border.

7. The method of claim 6, comprising:
classifying the high speed of the user equipment as one selected class of a number of classes,
wherein dynamically adjusting how many of the one or more first antenna nodes serve the overlap region of the first cell comprises reading configuration data from stored transmission configuration data indexed by the selected class.

8. The method of claim 6, wherein dynamically adjusting how many of the one or more first antenna nodes operate in the overlap region of the first cell comprises:
adjusting a transmit power level of at least one of the one or more first antenna nodes from an initial level that is less than a nominal maximum transmit power level to an adjusted level that is the nominal maximum transmit power level.

9. The method of claim 6, wherein dynamically adjusting how many of the one or more first antenna nodes operate in the overlap region of the first cell comprises:
adjusting a transmit power level of at least one of the one or more first antenna nodes from an initial non-zero level to an adjusted level that mutes the one of the one or more first antenna nodes.

10. The method of claim 6, wherein dynamically adjusting how many of the one or more first antenna nodes operate in the overlap region of the first cell comprises:
gradually decreasing a transmit power level of at least one of the one or more first antenna nodes from an initial non-zero level.

11. The method of claim 1, comprising:
coordinating power levels and/or number of the one or more first antenna nodes with power levels and/or number of one or more second antenna nodes serving the overlap region of the second cell that are associated with the overlap region of the second cell.

12. The method of claim 11, wherein coordinating power levels and/or number of the one or more first antenna nodes with power levels and/or number of one or more second antenna nodes serving the overlap region of the second cell that are associated with the overlap region of the second cell comprises:
the first node communicating with the second node.

13. The method of claim 11, wherein coordinating power levels and/or number of the one or more first antenna nodes with power levels and/or number of one or more second antenna nodes serving the overlap region of the second cell that are associated with the overlap region of the second cell comprises:
the first node communicating with a core network node other than the second network node, wherein the core network node is not a peer node of the first node.

14. The method of claim 1, wherein:
the one or more first antenna nodes are a first set of one or more first antenna nodes that each form downlink beams oriented in a first direction;
the plurality of first antenna nodes comprises a second set of one or more first antenna nodes that are located along the track and which provide the mobile communications service associated with the first cell;
the second set of one or more first antenna nodes each form downlink beams oriented in a second direction that is different from the first direction;
the one or more first antenna nodes comprise one or more transition antenna nodes that provide mobile telecommunications service associated with the first cell and that are located at positions along the track that are between positions at which the first set of first antenna nodes are located and positions at which the second set of first antenna nodes are located; and the transition antenna nodes form a plurality of transitioning downlink beams that vary in orientation from one another such that the user equipment will experience a gradual change in beam orientation as it first passes by one of the first and second sets of one or more first antenna nodes, then passes by the one or more transition antenna nodes and then passes by an other one of the first and second sets of one or more first antenna nodes.

15. The method of claim 1, wherein one or more of the one or more of the first antenna nodes that serve the overlap region of the first cell also serve a surrounding area alongside the track.

16. A controller for operating a first network node in a cellular communications network, wherein the first network node is connected to a plurality of first antenna nodes that are located along a track and which provide mobile telecommunications service associated with a first cell, wherein one or more of the first antenna nodes serve an overlap region of the first cell that overlaps an overlap region of a second cell that is associated with a plurality of second antenna nodes that are located along the track and that are connected to a second network node, the controller comprising:

circuitry configured to cause the one or more first antenna nodes to each form downlink beams in a same direction along the track as one another;

circuitry configured to control transmitter power levels of each of the one or more first antenna nodes such that:

respective amounts of overlap between the downlink beams and respective power levels of the downlink beams jointly cause the overlap region of the first cell to emulate a cell border for a user equipment travelling at or above a known high speed through the overlap region of the first cell, wherein downlink signal power distributed through the emulated cell border is lower at emulated cell border locations closer to an emulated cell outer edge than at emulated cell border locations more distant from the emulated cell outer edge; and the emulated cell border has a length sufficient to cause the user equipment travelling at the known high speed to be within the emulated cell border for at least a predetermined minimum amount of time necessary to successfully perform a handover of cellular communication service for the user equipment from one of the first and second cells to a different one of the first and second cells.

17. The controller of claim 16, wherein the circuitry configured to control transmitter power levels of each of the one or more first antenna nodes comprises circuitry configured to read stored configuration data from a nontransitory storage medium.

18. The controller of claim 16, wherein:

the user equipment is one of a plurality of user equipments, each travelling at a respective speed through or approaching the overlap region of the first cell; and the controller comprises circuitry configured to select, as the known high speed, a highest speed from among the respective speeds of the user equipments.

19. The controller of claim 18, wherein:

the circuitry configured to control transmitter power levels of each of the one or more first antenna nodes comprises circuitry configured to determine the transmitter power levels of each of the one or more first antenna nodes based on the selected highest speed.

20. The controller of claim 18, comprising:

circuitry configured to classify the selected highest speed as one selected class of a number of classes; and circuitry configured to read stored transmission configuration data indexed by the one selected class.

21. The controller of claim 16, comprising:

circuitry configured to dynamically adjust how many of the one or more first antenna nodes operate in the overlap region of the first cell based on the known high speed of the user equipment such that the higher the known high speed, the more the number of first antenna nodes that serve the emulated cell border.

22. The controller of claim 21, comprising:

circuitry configured to classify the high speed of the user equipment as one selected class of a number of classes, wherein the circuitry configured to dynamically adjust how many of the one or more first antenna nodes serve the overlap region of the first cell comprises circuitry configured to read configuration data from stored transmission configuration data indexed by the selected class.

23. The controller of claim 21, wherein the circuitry configured to dynamically adjust how many of the one or more first antenna nodes operate in the overlap region of the first cell comprises:

circuitry configured to adjust a transmit power level of at least one of the one or more first antenna nodes from an initial level that is less than a nominal maximum transmit power level to an adjusted level that is the nominal maximum transmit power level.

24. The controller of claim 21, wherein the circuitry configured to dynamically adjust how many of the one or more first antenna nodes operate in the overlap region of the first cell comprises:

circuitry configured to adjust a transmit power level of at least one of the one or more first antenna nodes from an initial non-zero level to an adjusted level that mutes the one of the one or more first antenna nodes.

25. The controller of claim 21, wherein the circuitry configured to dynamically adjust how many of the one or more first antenna nodes operate in the overlap region of the first cell comprises:

circuitry configured to gradually decrease a transmit power level of at least one of the one or more first antenna nodes from an initial non-zero level.

26. The controller of claim 16, comprising:

circuitry configured to coordinate power levels and/or number of the one or more first antenna nodes with power levels and/or number of one or more second antenna nodes serving the overlap region of the second cell that are associated with the overlap region of the second cell.

27. The controller of claim 26, wherein the circuitry configured to coordinate power levels and/or number of the one or more first antenna nodes with power levels and/or number of one or more second antenna nodes serving the overlap region of the second cell that are associated with the overlap region of the second cell comprises:

circuitry configured to cause the first node to communicate with the second node.

28. The controller of claim 26, wherein the circuitry configured to coordinate power levels and/or number of the one or more first antenna nodes with power levels and/or number of one or more second antenna nodes serving the overlap region of the second cell that are associated with the overlap region of the second cell comprises:
    circuitry configured to cause the first node to communicate with a core network node other than the second network node, wherein the core network node is not a peer node of the first node.

29. The controller of claim 16, wherein:
    the one or more first antenna nodes are a first set of one or more first antenna nodes that each form downlink beams oriented in a first direction;
    the plurality of first antenna nodes comprises a second set of one or more first antenna nodes that are located along the track and which provide the mobile communications service associated with the first cell;
    the second set of one or more first antenna nodes each form downlink beams oriented in a second direction that is different from the first direction;
    the one or more first antenna nodes comprise one or more transition antenna nodes that provide mobile telecommunications service associated with the first cell and that are located at positions along the track that are between positions at which the first set of first antenna nodes are located and positions at which the second set of first antenna nodes are located; and
    the transition antenna nodes form a plurality of transitioning downlink beams that vary in orientation from one another such that the user equipment will experience a gradual change in beam orientation as it first passes by one of the first and second sets of one or more first antenna nodes, then passes by the one or more transition antenna nodes and then passes by an other one of the first and second sets of one or more first antenna nodes.

30. The controller of claim 16, wherein one or more of the one or more of the first antenna nodes that serve the overlap region of the first cell also serve a surrounding area alongside the track.

31. A nontransitory computer-readable storage medium comprising a set of program instructions that, when executed by one or more processors, perform a method of operating a first network node in a cellular communications network, wherein the first network node is connected to a plurality of first antenna nodes that are located along a track and which provide mobile telecommunications service associated with a first cell, wherein one or more of the first antenna nodes serve an overlap region of the first cell that overlaps an overlap region of a second cell that is associated with a plurality of second antenna nodes that are located along the track and that are connected to a second network node, the method comprising:
    causing the one or more first antenna nodes to each form downlink beams in a same direction along the track as one another;
    controlling transmitter power levels of each of the one or more first antenna nodes such that:
        respective amounts of overlap between the downlink beams and respective power levels of the downlink beams jointly cause the overlap region of the first cell to emulate a cell border for a user equipment travelling at or above a known high speed through the overlap region of the first cell, wherein downlink signal power distributed through the emulated cell border is lower at emulated cell border locations closer to an emulated cell outer edge than at emulated cell border locations more distant from the emulated cell outer edge; and
    the emulated cell border has a length sufficient to cause the user equipment travelling at the known high speed to be within the emulated cell border for at least a predetermined minimum amount of time necessary to successfully perform a handover of cellular communication service for the user equipment from one of the first and second cells to a different one of the first and second cells.

* * * * *